Feb. 21, 1967  H. C. KRONE  3,304,952
VENT CONTROL DEVICE
Filed March 15, 1965  3 Sheets-Sheet 2

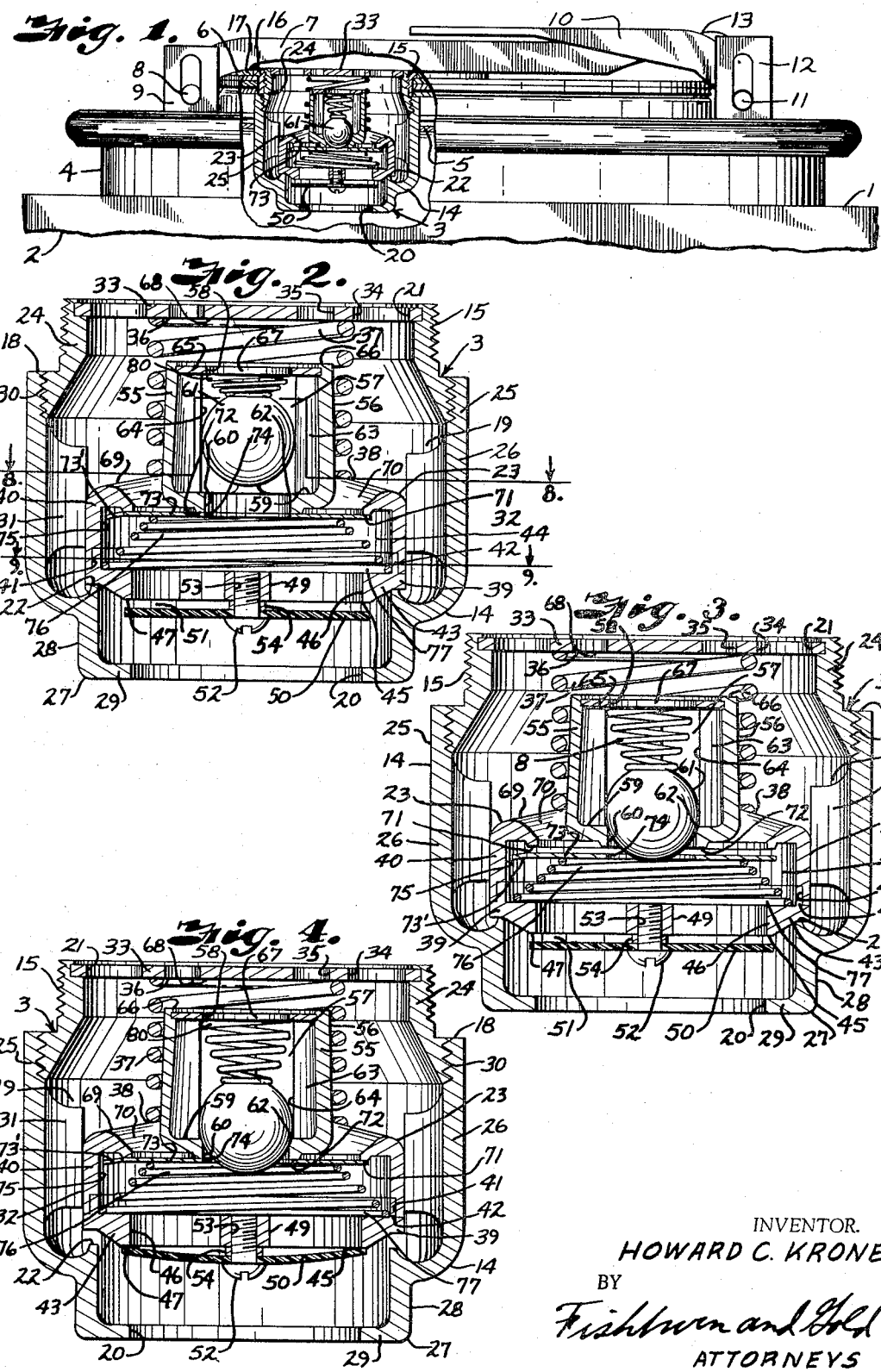

INVENTOR.
HOWARD C. KRONE
BY
*Fishburn and Gold*
ATTORNEYS

Feb. 21, 1967  H. C. KRONE  3,304,952
VENT CONTROL DEVICE
Filed March 15, 1965  3 Sheets-Sheet 3

INVENTOR.
HOWARD C. KRONE
BY
Fishburn and Gold
ATTORNEYS

United States Patent Office 3,304,952
Patented Feb. 21, 1967

3,304,952
VENT CONTROL DEVICE
Howard C. Krone, Overland Park, Kans., assignor to William A. Knapp Company, Kansas City, Mo., a corporation of Missouri
Filed Mar. 15, 1965, Ser. No. 439,554
14 Claims. (Cl. 137—493.9)

This invention relates to vent control devices for receptacles, and more particularly to vent control devices for use with liquid receptacles such as tanks for containing and transporting volatile or inflammable liquids as, for example, liquid fuels and the like.

In transporting or storing inflammable liquids such as liquid fuels, agitation of the liquid contents of the tanks or atmospheric changes may volatilize lighter ends of the liquid to form explosive or inflammable vapors. Surrounding heat, as from the sum, may cause expansion of the contents and differential pressure between the interior and exterior. Cooling of the surrounding areas, or draining of liquid from the tanks, may result in reduced pressure in the tank interior and thereby a differential pressure between the interior and exterior of said tank. Emergency conditions can arise from rapid volatilization of the liquid whereby the vapors do not escape rapidly enough through a normal vent, as in the case of an extremely hot sun or a fire in the immediate vicinity. Also, the vent structure may be subjected to an emergency condition in the event of upsetting or overturning of the tank.

The principal objects of the present invention are to provide a vent closure structure for receptacles which will adapt itself to all venting requirements and safety protection from conditions resulting from the above-mentioned situations including both expansion and contraction of the liquid and/or vapor within the tank, surging of the liquid or overturning of the tank; to provide a vent control device which has a small vent capacity controlled by a valve opening under low internal super-atmospheric pressure for venting of normal pressure differentials contained within a valve member biased to close a vent opening of large capacity which is opened in response to a predetermined higher internal pressure for emergency relief; to provide such a structure wherein the valve member has passages or ports normally closed by a valve member that opens in response to sub-atmospheric pressure in the receptacle for relieving same; to provide such a structure wherein the valve member has a flexible diaphragm adjacent a seat surrounding a passage and normally spaced therefrom and moving to close said passage in response to a surge of liquid or fluid toward said passage from the interior of the receptacle; to provide a vent control device having a vent housing for connection to a receptacle and having a passage with a bottom opening in communication with the receptacle interior and top opening to the atmosphere and an outwardly facing seat surrounding said passage and a valve member movably mounted in the passage and biased into seating engagement with the seat to stop outward flow through said passage, said valve member being moved to open position in response to emergency super-atmospheric pressures in the interior of the receptacle; to provide such a housing and valve member with valve controlled ports which are opened for relieving normal sub-atmospheric or super-atmospheric pressure in the receptacle; to provide such a structure wherein the valve members operate in large chambers with spaced guides for assured alignment and seating the valve members and when in open position there is substantially unrestricted flow through the chambers to the respective opening of the housing for the required venting of the receptacle; and to provide a vent control device and tank closure that is economical to manufacture and which will adapt itself to all venting requirements.

Other objects and advantages of this invention will become apparent from the following description taken in connection with the accompanying drawings where in are set forth by way of illustration and example certain embodiments of this invention.

FIG. 1 is a partial eleventational view of a tank and closure with portions broken away to show the vent control structure located therein.

FIG. 2 is an enlarged sectional view through the vent structure with the parts located in position for relieving normal internal super-atmospheric pressure of a receptacle.

FIG. 3 is a sectional view similar to FIG. 2 with the parts shown in position for relieving sub-atmospheric pressure in the receptacle.

FIG. 4 is a sectional view through the vent device similar to FIG. 2 with the parts in position for emergency relieving of super-atmospheric pressure in the receptacle.

Figure 5:
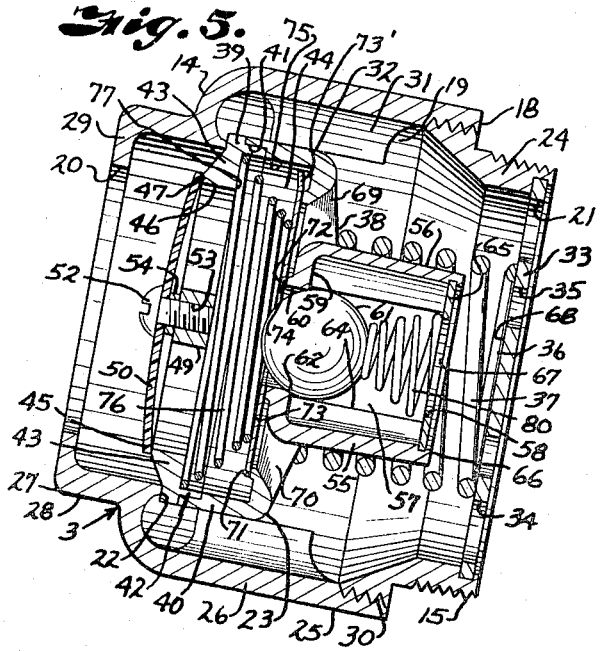
FIG. 5 is a sectional view through the vent device in a position acquired on an outerturned receptacle with the valve members in flow closing position.

Referring more in detail to the drawings:

In the drawings, I show a fragmentary portion of the upper wall 1 of a storage or transportation tank or receptacle 2 formed of sheet metal or other suitable material and adapted to contain liquids or fluids as, for example, inflammable material such as volatile liquid fuels and the like. The reference numeral 3 generally designates a vent unit suitably arranged and connected relative to the tank to provide vent control between the interior and exterior under both normal and emergency conditions.

In the structure illustrated, the tank 2 is provided as is usual practice with a manhole defined by an annular neck 4 which is welded or otherwise suitably attached to the wall 1 in a leakproof fashion. A cover 5 is suitably secured to the neck to provide a seal for the manhole. The cover 5 has a fill opening normally sealed by an assembly which includes a fill cap or plate 6 carried on a crossbar or strongback 7 that is hinged as at 8 on lugs 9 attached to the cover 5. A suitable lock member 10 is hingedly mounted as at 11 on lugs 12 attached to the cover 5 in a manner that the lock member or lever 10 has engagement with a portion 13 of the crossarm to secure same in position to hold the cap or plate 6 in position to close the fill opening. The vent unit 3 is mounted in the fill cap or plate 6 preferably substantially under the crossarm 7 to provide for controlled venting of pressure to and from the interior of the tank 2 to effect substantial equalization of pressure between the tank and the exterior thereof.

The vent unit 3 includes a hollow casing or housing 14 suitably connected to the fill cap or plate 6 and, in the structure illustrated, the housing 14 is generally cylindric and formed at the top with a diametrically reduced threaded portion or neck 15 so as to be screwable as shown in FIG. 1 upward into a member 16 on the fill cap or plate 6 of the tank with which the vent valve is to be used. It is preferred that the member 16 be a nut threaded on the threaded neck 15 with the nut having an annular flange 17 cooperating with an upwardly facing shoulder 18 on the housing 14 to clamp the cover plate therebetween and fix the housing 14 thereto in a substantially sealed relationship.

The housing 14 is preferably arranged with a passage 19 having a bottom opening 20 for communication with the interior of the receptacle 2 and a top opening 21 communicating with the atmosphere or exterior of the receptacle. The housing has an upwardly facing seat 22 surrounding the passage 19 and a valve member 23 is movably mounted in said passage and is biased downwardly to seat on said valve seat 22. In the structure illustrated, the valve member 23 is arranged whereby there is additional structure therein so that when it is engaged with the seat 22 to close the passage 19 normal pressures may be relieved or vented, as later described.

The housing 14 is preferably made of multiple parts which includes a top section 24 which provides the threaded neck 15 and a lower section 25 which has a medial portion 26 of annular configuration and a reduced lower portion 27 which has the seat 22 inset from the wall of the annular portion 26. The portion 27 has an annular wall 28 extending downwardly from the seat 22 and terminating in an inwardly extending flange 29 that defines the bottom opening 20. The top section 24 and bottom section 25 are continuously interconnected by screw threads 30 extending from the shoulder 18. The medial portion 26 has a plurality of circumferentially spaced radially inwardly extending ribs 31 having inner faces that substantially engage the peripheral surface 32 of the valve member 23 and form guides for movement of said valve member 23 axially of the housing 14 toward and away from the seat 22. The upper or top section 24 of the housing has a top wall 33 at the upper end thereof which wall may be integral with the section 24 or a separate plate anchored therein, as illustrated in FIG. 2. The plate 33 has a plurality of circumferentially spaced slots 34 adjacent the outer portion thereof and a plurality of circumferentially spaced holes 35 radially inwardly from the slots 34. The portion of the plate 33 between the slots 34 and holes 35 is preferably engaged by the upper end 36 of a spring 37 having its lower end engaging an upwardly facing shoulder 38 on the valve member 23 to urge or bias said valve member downwardly into seating engagement with the seat 22. The spring 37 is preferably such that with the weight of the valve member and assembly therein the valve member is maintained in seated position until a predetermined superatmospheric pressure is attained inside of the tank or receptacle and then the valve member will be opened as, for example, the valve member may open at pressures above three pounds per square inch. This may be termed high pressure relief.

The valve member 23 below the shoulder 38 has an enlarged portion 39 that has the periphery 32. It is preferred that this enlarged portion be of a two-piece structure wherein an annular wall 40 has a bottom opening 41 into which extends a flange 42 suitably secured thereto, said flange being on a bottom member or closure 43 which is also the bottom of a chamber 44 in the lower portion of the valve member 23. The member 43 has a bottom wall 45 provided with an opening 46 which is surrounded by a downwardly facing seat 47. The member 43 is provided with a transverse bar or web 48 across the opening 46 and having an enlarged portion 49 centrally disposed of the opening 46 for mounting a diaphragm valve 50. The diaphragm member 50 is preferably of a flexible resilient member or disc which may be made of material such as tetraflor or the like and that normally is in a single plane and spaced from the seat 47 to provide a flow passage 51 therebetween. The thin diaphragm 50 is such that a surge of fluid outwardly of the vent unit will flex the diaphragm whereby the peripheral portion thereof will seat on the seat 47 and close the opening 46. In the structure illustrated, the diaphragm is secured to the bottom member by a suitable fastening device such as a screw 52 having its shank threaded into a threaded aperture 53 in the portion 49 with a spacer 54 between the diaphragm and portion 49 to define the space normally present between the peripheral portion of the diaphragm and the seat 47.

An axial extension 55 is upstanding from the enlarged portion 39 of the valve member 23, said extension being generally cylindrical with the spring 37 sleeved thereover. The extension 55 has a peripheral wall 56 that defines a chamber 57 extending therein from a top opening 58 and terminating in a bottom wall 59 which bottom wall has an axial flow passage or opening 60 therethrough. Flow through the opening 60 is controlled by a ball 61 movable in the chamber 57 and normally engaged with a seat 62 to close said flow. The chamber 57 has a plurality of circumferentially spaced ribs 63 extending radially inwardly from the wall 56 and terminating in guide surfaces 64 for guiding the ball in its movement axially of the valve member. These guides provide for holding the ball axially and when the ball is moved upwardly from the seat 62 there can be flow around the ball in the space between the ball and the wall 56, said spacing being of such area that there is substantially unrestricted flow therethrough. The open upper end of the chamber 57 is provided with a stop member or retainer washer 65 suitably secured to the wall 56 as by flanging the upper edge thereof over said washer as at 66. The washer has a bore 67 for passage of vapors therethrough and also will provide engagement with the ball in the event it is moved to the upper end of the chamber so that said washer retains the ball in the chamber and prevents escape thereof. It should be noted that the top wall 33 is solid with no opening immediately above the bore 67 of the washer so that if any liquid-laden vapors are passing through the opening 67 they will impinge on the central portion 68 of the closure or top wall 33 tending to cause any droplets to fall back down the passage 19.

The upper portion of the enlarged part 39 of the valve member 23 has a wall 69 connecting the wall 40 with the extension 55. The wall 69 has a plurality of circumferentially spaced ports 70. Also, the lower face of the wall 69 has a downwardly extending seat portion 71 surrounding the ports 70 and a second seat portion 72 concentric with the seat portion 71 and surrounding the bore or opening 60. The seats 71 and 72 are adapted to be engaged by a disc valve member 73 having a central aperture 74 substantially registering with the bore or opening 60. The disc valve member 73 has circumferentially spaced outwardly extending lugs 73' in proximity with the interior surface 75 of the wall 40 whereby the valve disc remains centered. The valve disc is urged or biased into seating engagement with the downwardly facing seats 71 and 72 by a spring 76 that is generally conical contour with the upper end engaging the valve member 73 and the lower end 77 seating on the upper face of the bottom member 43 whereby in response to suction or subatmospheric pressure in the receptacle, the valve disc 73 will be drawn downwardly compressing the spring 76 for flow of air from the exterior of the tank through the opening 21, passage 19, ports 70, chamber 44, space 51 and opening 20 to the interior of the tank.

In the use of a vent unit 3 constructed and assembled as described, and located on a tang or receptacle 2 containing volatile liquid, normally the ball 61 engages the seat 62 to close the flow through the passage or bore 60, the disc valve 73 engages the seats 71 and 72 to prevent flow through the ports 70, the valve member 23 engages the seat 22 and, even though the diaphragm 50 is in the position illustrated in FIG. 1 wherein there is a space 51 between the diaphragm and the seat 47, flow through the vent unit is prevented. This will cause a slight pressure to be maintained in the receptacle 2 to restrain evaporation to a minimum, such pressure obviously being determined by the force necessary to lift the ball 61 from its seat for low pressure venting. In the case of a vent structure for use on gasoline tanks, it is preferred that not more than one pound per square inch be required to lift the ball 61. Accordingly, when this predetermined pressure is exceeded due to climatic or other conditions, the ball 61 is lifted as shown in FIG. 2 thereby permitting the excess gas to escape through the opening 20, space 51, opening 46, chamber 44, bore 74, bore 60, chamber 65, bore 67 and openings 34 and 35. This is a devious passage which tends to avoid any splashing of liquid from the tank. However, if there is a surging of the liquid against the vent unit, then the force of the surging liquid striking the diaphragm 50 will deflect same to engagement with the seat 47 to close the space 51 and prevent the liquid from passing through the bore 46 and thereby prevent escape of the liquid. During draining of the tank or due to climatic changes wherein the pressure in the tank becomes subatmospheric, this pressure differential is relieved by the pressure differential acting on the disc valve 73 drawing same downwardly away from the seats 71 and 72 and compressing the spring 76. This moves the disc valve to a position as illustrated in FIG. 3 wherein air from the exterior can move through the openings 34, passage 19, ports 70, opening 46, space 51, and through the bottom opening 20 into the tank 2.

The valve member 23 is normally maintained in engagement with the seat 22 by means of the spring 37. If there should be a rapid increase in pressure in the tank to an extent that raising of the ball 61 will not permit sufficient flow for relief, and if there is a surge of such pressure, the surge will tend to cause the diaphragm 50 to close the space 51 and the pressure, for example of not less than three pounds per square inch, will raise the valve member 23 from the seat 22 to a position as illustrated in FIG. 4, thereby providing increased area for flow and relief. If there is not surge or rapid increase of pressure, the diaphragm 50 will remain in a single plane and, in such instance, the ball 61 will be raised from its seat and also the valve member 23 will raise from its seat 22 providing maximum capacity for relief flow. A suitable structure is such wherein the ball valve being raised will provide approximately .44 square inch area for flow relief and then if the pressure increases in an emergency situation, as for example up to five pounds per square inch, the valve member 23 also lifts to provide an additional area, as for example approximately 2.1 square inches of area for relief at the rate of approximately 460 cubic feet per minute.

Figure 6:
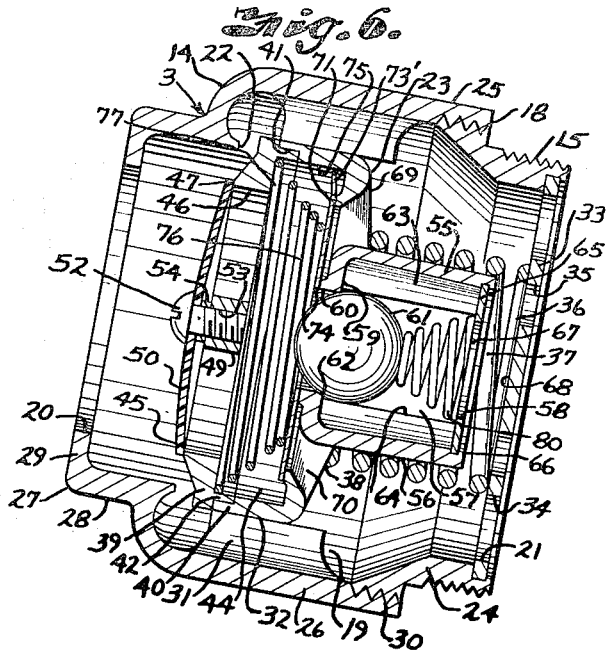
FIG. 6 is a sectioanl view through the vent device similar to FIG. 5 with the parts in position for relieving internal pressures.
Figure 7:
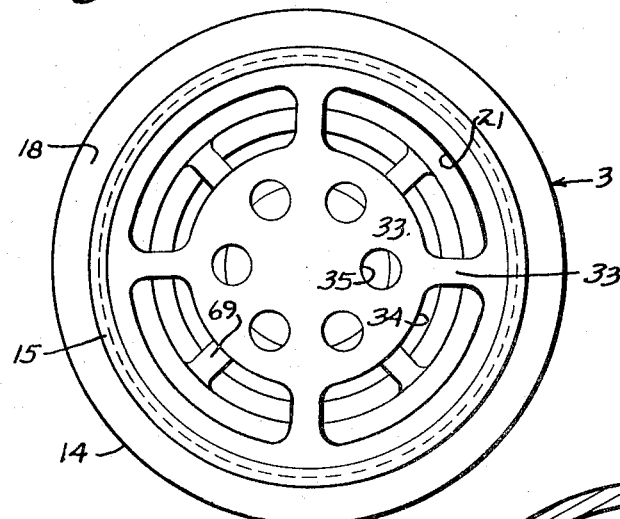
FIG. 7 is a top plan view of the vent device.
Figure 8:
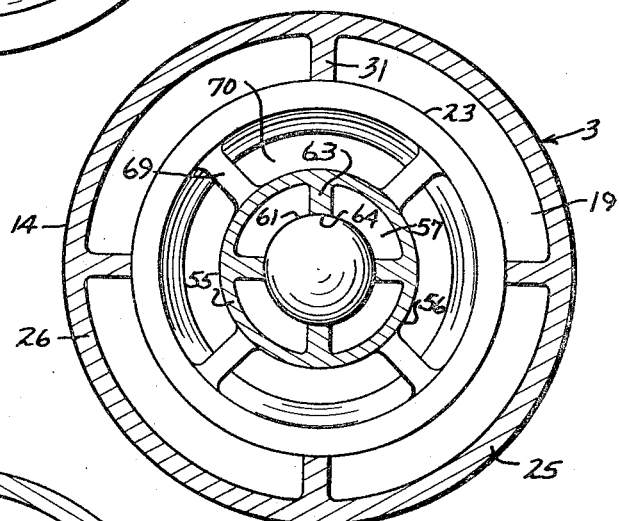
FIG. 8 is a transverse sectional view through the vent device taken on the line 8—8, FIG. 2.
Figure 9:
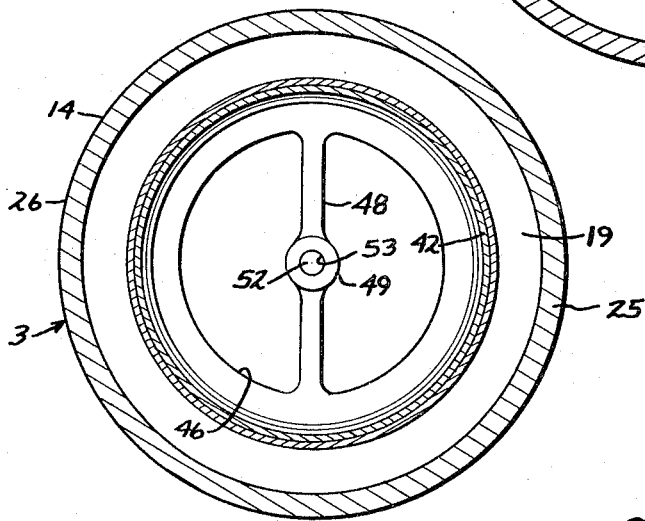
FIG. 9 is a transverse sectional view through the vent device taken on the line 9—9, FIG. 2.

In the event of overturning of the tank, the weight of the liquid against the diaphragm 50 will cause same to engage its seat 47 and the spring 37 holding the valve member 23 in closed position prevents the liquid contents from spilling through the vent valve regardless of the position of the ball 61. Furthermore, in the overturned position, if pressure due to the head of the gasoline in the tank should not be more than three pounds per square inch and thereby not sufficient to overcome the spring 37, the valve member 23 remains in its seated position. However, if the overturning of the tank is attended by fire and pressure in the tank should rapidly increase, as for example to more than three pounds, it will then overcome the spring 37 and cause the valve member 23 to move from its seat 22 to a position as illustrated in FIG. 6, thereby giving the overturned relieving pressure position. In this operation, the diaphragm 50 also acts as an overturn valve so that the position of the valve 61 is not material in the overturned position. This permits the use of a spring 80 to load the ball valve 61 for opening at a pressure of less than one pound per square inch. As illustrated in FIG. 1, the valve unit is located within the cover 6 under the strongback 7 so that the valve is protected against breaking off and allowing the liquid to escape in the event of accidental rolling over of the tank.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A vent control device for flammable liquid storage receptacles comprising,
 (a) a vent housing for connection to a receptacle and having a passage with a bottom opening in communication with a receptacle interior and a top opening to the atmosphere,
 (b) an upwardly facing seat surrounding said passage and spaced from said bottom opening,
 (c) a pressure-responsive relief valve member movably guided in said housing and biased into seating engagement with said seat,
 (d) said pressure-responsive relief valve member having an inner chamber with a bottom opening in communication with said passage below said upwardly facing seat and top ports communicating with the passage above said upwardly facing seat,
 (e) valve means normally closing said ports,
 (f) and a flow-responsive spill-prevention valve engageable with the valve member around said bottom opening thereof and normally sustained away therefrom for substantially unimpeded low rate flow thereabout.

2. A vent control device for flammable liquid storage receptacles comprising,
 (a) a vent housing for connection to a receptacle and having a passage with a bottom opening in communication with a receptacle interior and a top opening to the atmosphere,
 (b) an upwardly facing seat surrounding said passage and spaced from said bottom opening,
 (c) a pressure-responsive relief valve member movably guided in said housing and biased into seating engagement with said seat,
 (d) said pressure-responsive relief valve member having an inner chamber with a bottom opening in communication with said passage below said upwardly facing seat and top ports communicating with the passage above said upwardly facing seat,
 (e) downwardly facing seat means around said top ports,
 (f) a suction responsive inlet valve biased into sealing engagement with said downwardly facing seat means,
 (g) and a flow-responsive spill-prevention valve engageable with the valve member around said bottom opening thereof and normally sustained away therefrom for substantially unimpeded low rate flow thereabout.

3. A vent control device as set forth in claim 2 wherein the vent housing has upper and lower connected portions with the upper portion having a top wall extending across said passage in the housing and having a plurality of spaced openings for communication from the passage to the atmosphere.

4. A vent control device for flammable liquid storage receptacles comprising,
 (a) a vent housing for connection to a receptacle and having a passage with a bottom opening in communication with a receptacle interior and a top opening to the atmosphere,
 (b) an upwardly facing seat surrounding said passage and spaced from said bottom opening,
 (c) a pressure-responsive relief valve member movably guided in said housing and biased into seating engagement with said seat,
 (d) said pressure-responsive relief valve member having an inner chamber with a bottom opening in communication with said passage below said upwardly facing seat and a plurality of spaced top ports communicating with the passage above said upwardly facing seat,
 (e) a downwardly facing seat means around said top ports,
 (f) a suction responsive inlet valve biased into seating engagement with said downwardly facing seat means,
 (g) an upward axial extension on said valve member having a bore communicating with the passage at the upper end portion of the housing and a reduced portion at the lower end communicating with the inner chamber in the valve member and having an upwardly facing seat thereon, (h) and a ball valve movable in said extension bore, said ball valve normally seating on the seat in the reduced portion of the bore to prevent flow therethrough and opening in response to pressure in said receptacle for low pressure relief.

5. A vent control device for flammable liquid storage receptacles comprising,
(a) a vent housing for connection to a receptacle and having a passage with a bottom opening in communication with a receptacle interior and a top opening to the atmosphere,
(b) an upwardly facing seat surrounding said passage and spaced from said bottom opening,
(c) a pressure-responsive relief valve member movably guided in said housing and biased into seating engagement with said seat,
(d) said pressure-responsive relief valve member having an inner chamber with a bottom opening in communication with the passage below said upwardly facing seat,
(e) a flow-responsive spill-prevention valve engageable with the valve member around said bottom opening thereof and normally sustained away therefrom for unimpeded low rate flow thereabout,
(f) an upward axial extension on said valve member having a bore communicating with the passage at the upper end portion of the housing and a reduced portion at the lower end communicating with the inner chamber in the valve member and having an upwardly facing seat thereon,
(g) and a ball valve movable in said extension bore, said ball valve normally seating on the seat in the reduced portion of the bore to prevent flow therethrough and opening in response to pressure in said receptacle for low pressure relief.

6. A vent control device for flammable liquid storage receptacles comprising,
(a) a vent housing for connection to a receptacle and having a passage with a bottom opening in communication with a recepatcle interior and a top opening to the atmosphere,
(b) an upwardly facing seat surrounding said passage and spaced from said bottom opening,
(c) a pressure-responsive relief valve member movably guided in said housing and biased into seating engagement with said seat,
(d) said pressure-responsive relief valve member having an inner chamber with a bottom opening in communication with the passage below said upwardly facing seat and a plurality of spaced top ports communicating with the passage above said upwardly facing seat,
(e) a downwardly facing seat means around said top ports,
(f) a suction-responsive inlet valve biased into seating engagement with said downwardly facing seat means,
(g) a flow-responsive spill-prevention valve engageable with the valve member around said bottom opening thereof and normally sustained away therefrom for unimpeded low rate flow thereabout,
(h) an upward axial extension on said valve member having a bore communicating with the passage at the upper end portion of the housing and an opening at the lower end communicating with the inner chamber in the valve member and having an upwardly facing seat spaced upwardly therefrom,
(i) and a valve movable in said extension bore and normally seating on the seat to prevent flow therethrough and opening in response to pressure in said receptacle for low pressure relief.

7. A vent control device for flammable liquid storage receptacles comprising,
(a) a vent housing for connection to a receptacle and having a passage with a bottom opening in communication with a receptacle interior and a top opening to the atmosphere,
(b) an upwardly facing seat surrounding said passage and spaced from said bottom opening,
(c) a pressure-responsive relief valve member movably guided in said housing and biased into seating engagement with said seat,
(d) said pressure-responsive relief valve member having an inner chamber with a bottom opening in communication with the passage below said upwardly facing seat and a plurality of spaced top ports communicating with the passage above said upwardly facing seat,
(e) a downwardly facing seat means around said top ports,
(f) a suction-responsive inlet valve biased into seating engagement with said downwardly facing seat means,
(g) a flow-responsive spill-prevention valve engageable with the valve member around said bottom opening thereof and normally sustained away therefrom for unimpeded low rate flow thereabout,
(h) an upward axial extension on said valve member having a bore communicataing with the passage at the upper end portion of the housing and a reduced portion at the lower end communicating with the inner chamber in the valve member and having an upwardly facing seat thereon,
(i) spaced guide members in said extension bore above said reduced portion and defining a valve path,
(j) and a ball valve movable in said extension bore and guided by said spaced guide members, said ball valve normally seating on the seat in the reduced portion of the bore to prevent flow therethrough and opening in response to pressure in said receptacle for low pressure relief.

8. A vent control device as set forth in claim 7 wherein said valve member extension has a retainer member fixed therein above said ball valve and with an opening of lesser size to prevent escape of the ball therefrom.

9. A vent control device as set forth in claim 8 wherein the vent housing has upper and lower connected portions with the upper portion having a top wall extending across said passage in the housing and having a plurality of spaced openings for communication from the passage to the atmosphere, said top wall being solid above the opening in the retainer in the extension.

10. A vent control device as set forth in claim 9 wherein the pressure-responsive relief valve member is biased into seat-engaging position by a spring engaging the top wall of the upper portion of the housing and sleeved on the extension of said valve member.

11. A vent control device as set forth in claim 10 wherein the flow-responsive spill-protection valve is a flat disc of flexible resilient material that will bend under flow surge to move the peripheral portion toward the valve member around the bottom opening thereof.

12. A vent control device as set forth in claim 11 wherein the vent housing has a wall defining said passage with a portion thereof upwardly from the upwardly facing seat being enlarged and spaced radially outwardly therefrom with a plurality of circumferentially spaced radially inwardly extending guide ribs having inner surfaces defining the path of movement of the pressure-responsive relief valve member.

13. A vent control device as set forth in claim 12 wherein the pressure-responsive relief valve member has a peripheral cylindrical wall spaced outwardly from the downwardly facing seat means and the suction-responsive inlet valve is a disc member with radially outwardly extending spaced lugs cooperating with the chamber-defining walls to form guides for said suction-responsive inlet valve.

14. A vent control device for flammable liquid storage receptacles comprising,
  (a) a vent housing for connection to a receptacle and having a passage with a bottom opening in communication with a receptacle interior and a top opening to the atmosphere,
  (b) an upwardly facing seat surrounding said passage and spaced from said bottom opening,
  (c) said vent housing having a wall defining said passage with a portion thereof upwardly from the upwardly facing seat being enlarged and spaced radially outwardly therefrom with a plurality of circumferentially spaced radially inwardly extending guide ribs having inner surfaces,
  (d) a pressure-responsive relief valve member movably guided in said housing and biased into seating engagement with said seat, said inner surfaces of the guide ribs defining the path of movement of said pressure-responsive relief valve member,
  (e) said pressure-responsive relief valve member having an inner chamber with a bottom opening in communication with said passage below said upwardly facing seat and top ports communicating with the passage above said upwardly facing seat,
  (f) downwardly facing seat means around said top ports,
  (g) said pressure-responsive relief valve member having a peripheral cylindrical wall spaced outwardly from the downwardly facing seat means,
  (h) a suction-responsive inlet valve biased into seating engagement with said downwardly facing seat means, said suction-responsive inlet valve being a disc member with guide means in the form of lugs circumferentially spaced thereon and cooperating with the chamber defining walls to maintain said disc member centered relative to said downwardly facing seat means.

References Cited by the Examiner

UNITED STATES PATENTS

| | | | |
|---|---|---|---|
| 1,893,942 | 1/1933 | Jensen | 137—493.6 |
| 2,016,278 | 10/1935 | Ehlers | 137—493.6 |
| 2,345,547 | 3/1944 | Roth et al. | 137—493.6 |

M. CARY NELSON, *Primary Examiner.*

R. J. MILLER, *Assistant Examiner.*